United States Patent [19]

Arato

[11] 4,207,642

[45] Jun. 17, 1980

[54] WASHING PLANT, PARTICULARLY FOR CARS AND AIRPLANES

[76] Inventor: Laszlo F. Arato, Seebuchtstrasse 19, CH-6374 Buochs NW, Switzerland

[21] Appl. No.: 917,666

[22] Filed: Jun. 21, 1978

Related U.S. Application Data

[63] Continuation of Ser. No. 764,973, Feb. 2, 1977, abandoned.

[30] Foreign Application Priority Data

Feb. 5, 1976 [CH] Switzerland ............... 001399/76

[51] Int. Cl.$^2$ .............................................. B60S 3/06
[52] U.S. Cl. .................................... 15/53 AB; 15/179
[58] Field of Search ........... 15/DIG. 2, 53 A, 53 AB, 15/179

[56] References Cited

U.S. PATENT DOCUMENTS

| 3,680,164 | 8/1972 | Thornton-Trump | 15/53 A |
| 3,835,498 | 9/1974 | Arato | 15/53 A |

FOREIGN PATENT DOCUMENTS

| 1810516 | 6/1970 | Fed. Rep. of Germany | 15/DIG. 2 |
| 1962021 | 10/1971 | Fed. Rep. of Germany | 15/DIG. 2 |

Primary Examiner—Edward L. Roberts
Attorney, Agent, or Firm—Darby & Darby

[57] ABSTRACT

A washing device for a body including a roller brush having two cylindrical brush elements and a sensor positioned in the gap therebetween and spaced from the boundary surface thereof to produce a signal upon a predetermined type of contact of the elements with the body.

7 Claims, 5 Drawing Figures

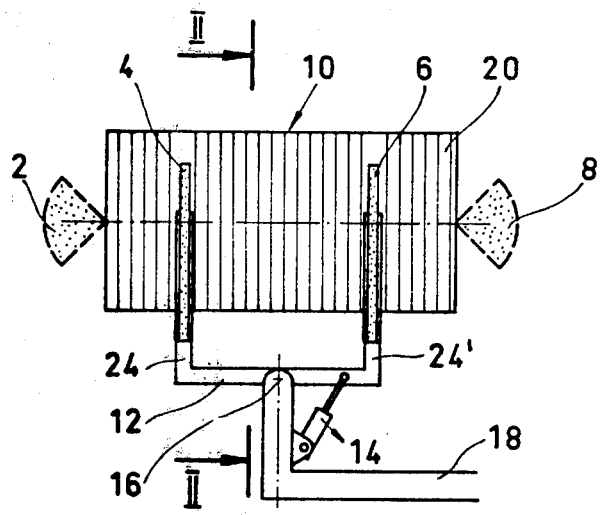
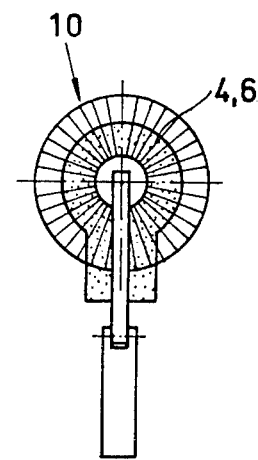
Fig.1  Fig.2
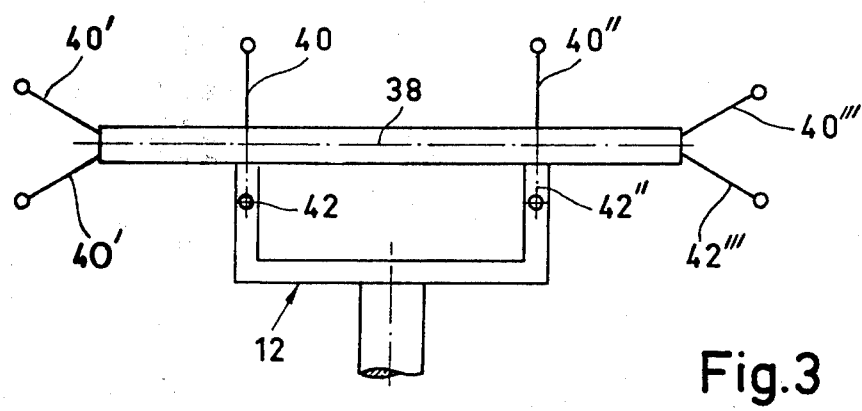
Fig.3

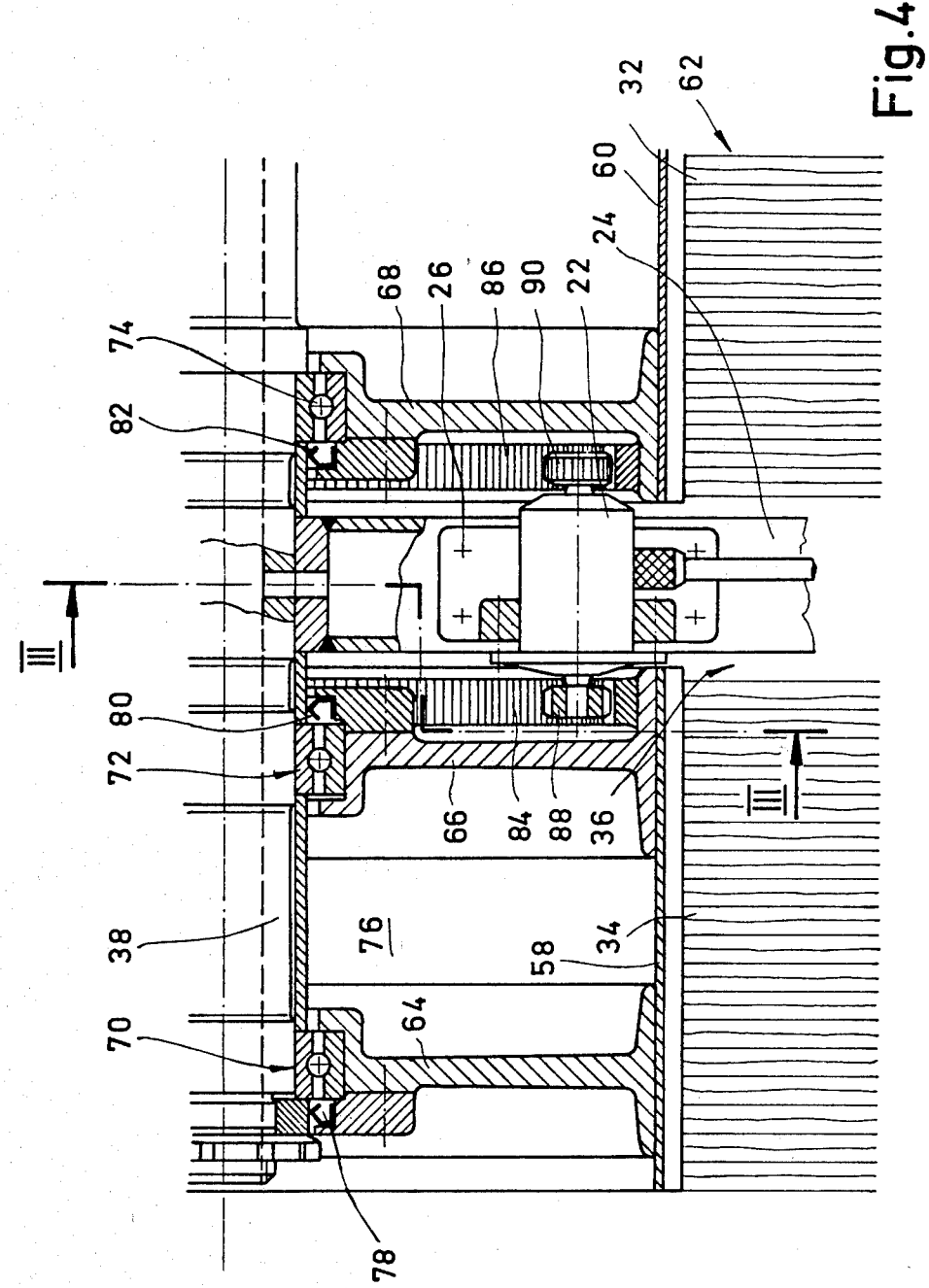

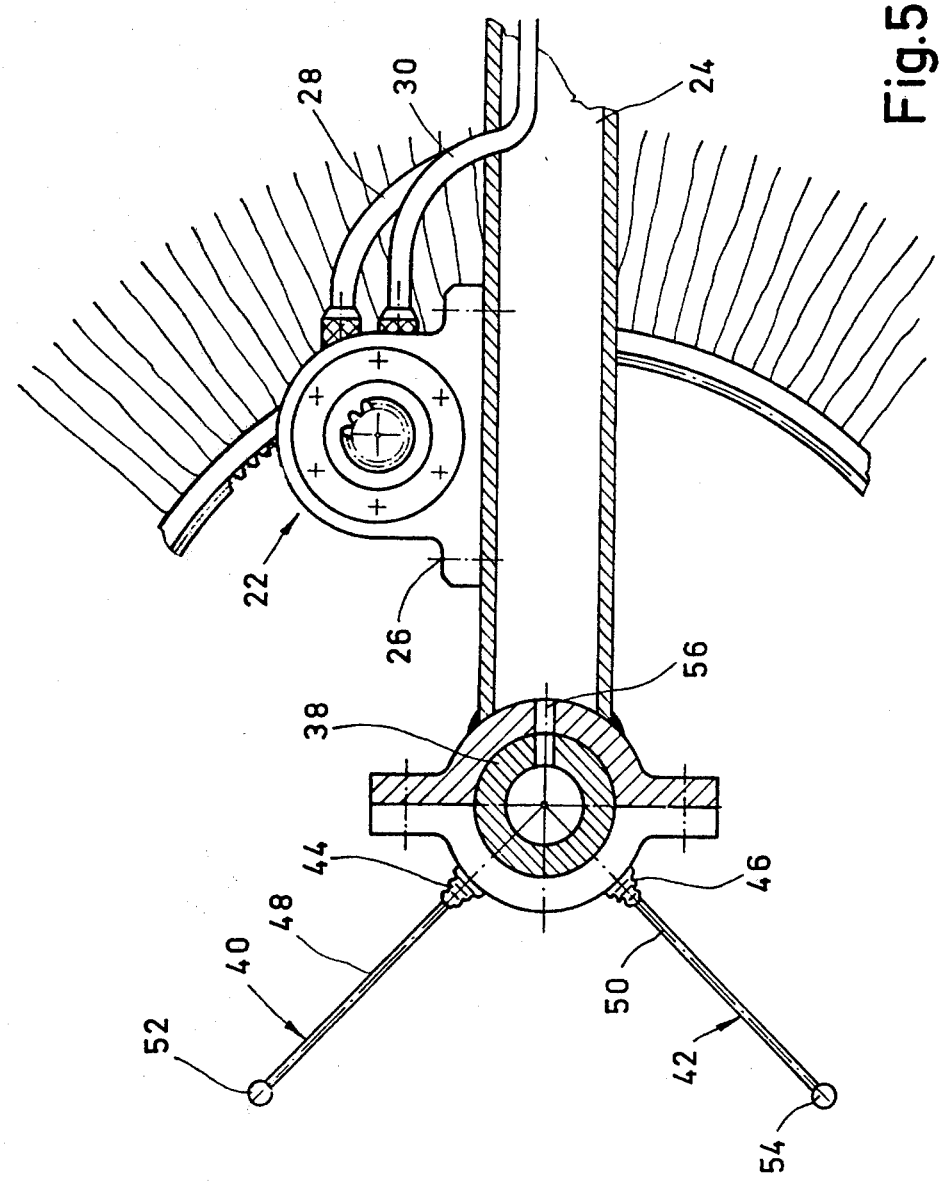

WASHING PLANT, PARTICULARLY FOR CARS AND AIRPLANES

This application is a continuation of my prior copending application Ser. No. 764,973 filed Feb. 2, 1977, now abandoned.

The invention concerns a washing plant, particularly for cars and airplanes, with a washing device guided by means of an adjusting mechanism over the surface of the part to be washed.

Such washing plants are known in connection with so-called "washing trains" for automobiles, particularly for passenger cars. The holders of the washing brushes feeding direction are prestressed here by a more or less constant force and are displaced by the car to be washed itself from their rest position toward this feeding force. The washing brushes bear thus directly on the car to be washed. This design has several drawbacks which limit considerably the field of application of these washing plants. The forces to be expended by the car to be washed to displace the washing brushes manifests themselves as pressure of the washing brushes on the surface to be washed, and are not constant, among others because the gyrating action of the rotating washing brushes enhances either the feeding force or the displacement force expended by the car depending on the direction of rotation. The variable pressure of the washing brush together with the size of the surface under the action of the brush, lead to considerable fluctuations of the specific surface pressure depending on the form of the covered area.

These fluctuations of the specific surface pressure have the result that the "depth of penetration" and thus the mode of operation of the washing brushes is subject to considerable fluctuations due to the different angle of attack of the bristles. Besides, the specific surface pressure can assume such high values that the scouring effect of the brushes not only dissolves the dirt adhering to the car to be washed, but also damages its surfaces, e.g. lacquered parts, sealing parts, projecting parts. This is particularly true for vehicles in light-weight construction e.g. airplanes where the skin is frequently only dimensioned for normal stresses appearing in operation.

In airplanes, washing with conventional washing plants is hardly conceivable, because, apart from the above-mentioned problems relating to the occurring stresses, there is another difficulty here caused by the shape of the airplane. As known, the shape of an airplane differs considerably from that of a street or track vehicle which latter corresponds substantially to a parallelipiped. Nevertheless, a clean outer surface is not only of esthetic, but also of considerable economic importance, particularly in airplanes.

For this reason, a washing plant has been suggested in U.S. Pat. No. 3,835,498 where the washing device is guided by program or physical model controlled adjusting drives. For setting up the program there is used a model of the body to be washed e.g. airplane, which is scanned three-dimensionally with a scanning device. This scanning device is connected to a coding device connected to a computer which in turn is coupled with a recording device for setting up the program. But it is not possible to determine on the model all values which are required for the exact guidance of the washing device, such as the position changes resulting from the load of the airplane, the tire pressure etc. Finally failure of the elaborate electronic control system can have the result that the washing device is brought too close or with too much pressure to the frequently very sensitive surface to be washed, thus causing damage. Besides, scanning on a model is complicated, and a possible source of deviations from the ideal position value for the control of the washing device.

The present invention is based on the problem of avoiding the inconveniences of the known washing devices or washing plants, and thus of finding a washing plant which substantially increases the protection against damage of the body to be washed with the above-mentioned washing plant or which can simplify its constructional or electronic design. Furthermore, the washing plant should permit particularly gentle washing. For the solution of this problem the invention suggests a washing plant of the above-mentioned type which is characterized in that at least one sensor is provided which is spaced from the outer boundary surface of the part of the washing device consisting of flexible material.

The signal emitted by the sensor is used to correct the position of the washing device by means of the existing control system. This control can be fully automatic, for example, according to the above-mentioned U.S. Pat. No. 3,835,498 or manual, where an automatic correcting device corrects the controlled values in both cases. In the simplest case, an optical or acoustic indication can be released by the sensor by which, in the case of a manual control, for example, the hydraulic adjusting mechanism effects immediately a correction of the position.

For a gentle washing treatment, particularly of sensitive surfaces, there is provided according to another feature of the washing plant of the invention an automatic control by which the force or the torque with which the washing device performs the washing movement can be varied or limited.

The sensors arranged according to the invention in the washing device of a brush roller, for example, can be designed as pressure head sensors or as mechanical approximation switches. The latter can have a switching bar with a contact end directed toward the surface to be washed, which is deflected on contact in its longitudinal direction and/or transverse thereto, so that an electric contact is established with a second electric pole.

The invention will be described more fully below on the basis of embodiments represented in the drawings.

FIG. 1 shows a schematic sectional representation of a roller brush with a part of its holder.

FIG. 2 shows a section through the roller brush according to FIG. 1 along line II—II.

FIG. 3 shows a schematic representation of the brush holder with examples of the arrangement of rod-shaped sensors.

FIG. 4 shows an axial section through a part of a roller brush with the brush drive.

FIG. 5 shows a section along line III—III of FIG. 4.

In the representations of FIGS. 1 and 2, the broken line 2–8 indicate regions of a roller brush 10 where sensors are arranged or effective if the washing device or this roller brush is to be positively prevented from coming too close to the surface to be washed or from exerting a too high mechanical washing pressure. In other words, the washing device is to be prevented from moving into the body to be washed. Sensors arranged in the lateral regions 2 and 8 of the brush roller act when either the roller brush acting on brush holder 12 is moved laterally or in an angle to the surface to be washed by the manually or program-controlled adjusting mechanism (not shown), or if the body has a form with surfaces extending in an angle to each other. A possible design of the adjusting mechanism which is not essential for the invention, is described in the above-mentioned U.S. patent. Thus, for example, the mechanism could include means for moving the brush over the surface of the body of the aircraft. For adaptation to convex surfaces, brush holder 12 can be turned by an adjusting drive 14 about an axle 16. Furthermore, two swivel brushes 10 can be held on a forked brush support 18 corresponding to the representation in FIG. 1, so that both brushes can embrace the body to be washed partly from two sides. The flexible brush material 20, consisting of numerous bristles or foam material, can adapt itself to a limited extent to the profiled body surfaces. In order to prevent excessive washing forces, which could lead to damages, means can be provided next to the sensors to limit the washing force and friction force respectively between the brush material and the surface of the body to be washed. These means consist e.g. of a hydraulic drive whose torque can be so controlled that a moment appears as a maximum torque which just suffices for cleaning. This is of particular importance, for example, if the washing device or the roller brush is moved under an angle to the surface to be washed, so that at first only one edge of the brush comes in contact with its surface. With increasing contact surface between the washing device and the surface, the torque can then be correspondingly increased by program control, for example.

FIGS. 4 and 5 show the transmission of the drive from the hydraulic motor 22 to the roller brush 10. The motor is secured on an arm 24 of brush holder 12 by means of screws 26. The hydraulic connecting lines 28, 30 or if an electromotor is used, the cable feed can be conducted through arm 24 designed as a tube. The roller brush consists of several brush elements 32, 34 etc. between which are provided gaps 36 through which the holding arms 24, 24' (see FIG. 1) are brought to the stationary brush axle 38. Correspondingly the hydraulic motor 22 secured on arm 24 is in one of these gaps 36, so that a motor with a small axial extension must be provided.

In the gaps between the brush elements are also arranged the sensors 40, 42 whose base 44, 46 is secured on the stationary brush axle 38. The sensors consist in the represented embodiment of flexible contact bars 48, 50 which extend in the direction of the anticipated contact with the surface of the body to be washed. FIG. 5 shows two such contact bars 48, 50, but substantially more can extend in numerous directions from the stationary brush axle 38. FIG. 3 shows the arrangement of sensors 40, 42, 40', 42', etc., at different points of brush axle 38.

The outer end 52, 54 of the contact bars widens, for example, spherically and is provided with a rubber-elastic coat to prevent damage to the surface to be washed on contact. The opposite inner bar end is elastically held in base 44, 46 and is arranged with a contact plate (not shown) in a slight distance from an opposite contact, so that a signal circuit is closed by a slight displacement of the contact bar. The electrical connecting lines to the sensors can be conducted to the central control unit (not shown) of the washing plant over through the hollow stationary brush axle 38 over a transverse bore 56 and the adjoining holding arm 24. Instead of individual contact bars, extending radially in different directions, a circular contact element (not shown) can be provided in a brush gap 36, whose outer circumference coincides with the boundary indicated in FIG. 2 by a region 4,6, while on its inner circumference one or several rod-shaped straps are secured which hold the circular contact element on brush axle 38 and which generates a signal in a deflection in the same manner as the contact bars described above.

The brush element 32, 34 etc. each consist of a hollow-cylindrical brush holder 58, 60 on the outer circumference of which are secured the numerous washing bristles 62 in a manner known in the manufacture of brushes, e.g. in grooves. Each bristle holder is detachably mounted on the outer circumference of nave discs 64, 66, 68 which are rotatably mounted by ball bearings 70, 72, 74 on the stationary brush axle 38. The space 76 between two nave discs 64, 66 is sealed by ring packings 78, 80, 82 against the access of wash fluid, so that the ball bearings are protected.

The above mentioned brush gaps 36 are thus limited in their range inside the cylindrical brush holders 58, 60 by nave discs 66, 68 on which is secured or formed a gear rim 84, 86 with an internal toothing. These gear rims are engaged by pinions 88, 90 of the above-mentioned hydraulic motor, which carries to this end on two opposite shaft ends one of these pinions. Naturally numerous modifications are possible within the above-described construction principle. The washing plant can also be so designed, for example, that the body to be washed is moved by the adjusting mechanism instead of the washing device, since only the relative movement is important.

The washing plant according to the invention permits to keep the washing device always in an optimum distance from the surface to be washed, so that a good washing effect is ensured.

What is claimed is:

1. A washing device for a body comprising:
   a roller brush which includes two cylindrical brush elements mounted for rotation about a non-rotating brush axle, at least a portion of each element being of an elastic material; and
   at least one sensor non-rotatably mounted on said brush axle, said sensor positioned between said elements in a gap therebetween and spaced from the outer boundary surface thereof for producing a signal upon a predetermined type of contact with the body.

2. A washing device according to claim 1 wherein the sensor has a contact bar with a contact end directed toward the surface to be washed, said bar being deflected on contact with said body so that an electrical contact is established between a pair of electric terminals.

3. A washing device according to claim 2 wherein the end of the contact bar opposite said contact end is held in an elastic base (44, 46) in which the pair of electric terminals are located.

4. A washing device according to claim 1 wherein the sensor includes a contact element extending toward the surface to be washed, said element being located between two brush elements and being connected to the non-rotating brush axle at an elastic base on the axle in which base is arranged responsive contact means.

5. A washing device according to claim 1 wherein a motor for driving the brush is arranged in the gap between said two brush elements of the roller brush.

6. A washing device according to claim 1 wherein the brush elements are hollow cylinders mounted detachably on nave discs which discs are rotatably mounted on the non-rotating brush axle, a motor for driving the brush and the sensor being arranged between two nave discs.

7. A washing device for a body comprising:
a roller brush which includes two cylindrical brush elements mounted for rotation about a non-rotating brush axle, wherein the brush elements are hollow cylinders detachably mounted on discs which are rotatably mounted on the non-rotating brush axle, at least a portion of each element being of an elastic material;

at least one sensor positioned between two said discs in a gap between said brush elements and spaced from the outer boundary surface thereof for producing a signal upon a predetermined type of contact with the body; and a motor for driving the roller brush.

* * * * *